(12) United States Patent
Weber et al.

(10) Patent No.: US 7,826,009 B2
(45) Date of Patent: Nov. 2, 2010

(54) HYBRID POLARIZER

(75) Inventors: Michael F. Weber, Shoreview, MN (US); Timothy J. Nevitt, Red Wing, MN (US); Roger J. Strharsky, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 774 days.

(21) Appl. No.: 11/614,494

(22) Filed: Dec. 21, 2006

(65) Prior Publication Data
US 2008/0151371 A1 Jun. 26, 2008

(51) Int. Cl.
*G02F 1/1335* (2006.01)
*G02B 5/30* (2006.01)

(52) U.S. Cl. .......... 349/96; 349/117; 349/137; 359/497

(58) Field of Classification Search .......... 349/96, 349/102, 117, 119; 359/487, 488, 490, 493, 359/497, 500, 498, 588, 589
See application file for complete search history.

(56) References Cited

U.S. PATENT DOCUMENTS

| | | | |
|---|---|---|---|
| 4,320,936 A | 3/1982 | Sawamura | |
| 4,659,523 A | 4/1987 | Rogers et al. | |
| 4,756,953 A | 7/1988 | Utsumi | |
| 4,895,769 A | 1/1990 | Land et al. | |
| 5,103,337 A | 4/1992 | Schrenk et al. | |
| 5,808,794 A | 9/1998 | Weber et al. | |
| 5,882,774 A | 3/1999 | Jonza et al. | |
| 6,096,375 A | 8/2000 | Ouderkirk et al. | |
| 6,124,971 A | 9/2000 | Ouderkirk et al. | |
| 6,179,948 B1 | 1/2001 | Merrill et al. | |
| 6,449,439 B1 * | 9/2002 | Boyd et al. | 396/374 |
| 6,498,683 B2 | 12/2002 | Condo et al. | |
| 6,697,195 B2 | 2/2004 | Weber et al. | |
| 6,774,961 B2 | 8/2004 | Faris et al. | |
| 6,859,245 B2 | 2/2005 | Faris et al. | |
| 2002/0186474 A1 | 12/2002 | Weber et al. | |
| 2003/0193636 A1* | 10/2003 | Allen et al. | 349/117 |
| 2004/0099992 A1* | 5/2004 | Merrill et al. | 264/290.2 |

(Continued)

FOREIGN PATENT DOCUMENTS

JP 11-160533 6/1999

(Continued)

OTHER PUBLICATIONS

Lazarev et al., Low-leakage off-angle in E-polarizers, Journal of the SID 9/2, pp. 101-105 (2001).

(Continued)

*Primary Examiner*—Dung T Nguyen
*Assistant Examiner*—Tai Duong
(74) *Attorney, Agent, or Firm*—Jay R. Pralle

(57) ABSTRACT

A hybrid polarizer includes an absorbing element having a first major surface and a second major surface. The hybrid polarizer also includes a first birefringent reflective polarizer disposed on the first major surface of the absorbing element, the first birefringent reflective polarizer having a first pass axis and a first block axis. The hybrid polarizer further includes a second birefringent reflective polarizer disposed on the second major surface of the absorbing element, the second reflective polarizer having a second pass axis and a second block axis.

9 Claims, 15 Drawing Sheets

U.S. PATENT DOCUMENTS

| | | | |
|---|---|---|---|
| 2004/0114248 A1* | 6/2004 | Hokazono et al. | 359/603 |
| 2004/0227994 A1 | 11/2004 | Ma et al. | |
| 2005/0200771 A1 | 9/2005 | Lazarev et al. | |

FOREIGN PATENT DOCUMENTS

| | | |
|---|---|---|
| WO | WO 95/17691 | 6/1995 |

OTHER PUBLICATIONS

Denker et al., "Advanced Polarzier Film for Improved Performance of Liquid Crystal Displays," presented at Society for Information Displays (SID) International Conference in San Francisco, CA, Jun. 4-9, 2006.

* cited by examiner

US 7,826,009 B2

HYBRID POLARIZER

FIELD OF THE INVENTION

The present disclosure is directed to polarizers, and, for example, hybrid polarizers and display devices using hybrid polarizers.

BACKGROUND

Display devices, such as liquid crystal display (LCD) devices, are used in a variety of applications including, for example, televisions, hand-held devices, digital still cameras, video cameras, and computer monitors. Because an LCD panel is not self-illuminating, some display applications may require a backlighting assembly or a "backlight." A backlight typically couples light from one or more sources (e.g., a cold cathode fluorescent tube (CCFT) or light emitting diodes (LEDs)) to the LCD panel.

Common display devices usually include polarizers. The most commonly used type of a polarizer is a dichroic polarizer. Dichroic polarizers are made, for example, by incorporating a dye into a polymer sheet that is then stretched in one direction. Dichroic polarizers can also be made by uniaxially stretching a semicrystalline polymer such as polyvinyl alcohol, then staining the polymer with an iodine complex or dichroic dye, or by coating a polymer with an oriented dichroic dye. Many commercial polarizers typically use polyvinyl alcohol as the polymer matrix for the dye. Dichroic polarizers normally have a large amount of absorption of light.

Another common type of a polarizer used in displays is a reflective polarizer. Reflective polarizers tend to be more efficient in transmitting light of the high transmission polarization. This is due to the use of a non-absorbing dielectric stack for polarizing light. These types of polarizers sometimes have defects, such as leakage of light through localized areas of the sheet and incomplete reflectivity of the high extinction polarization over the wavelength region of interest.

In some displays applications, reflective and dichroic polarizers have been combined, as described, for example, in Ouderkirk et. al. U.S. Pat. No. 6,096,375 and Weber et. al. in U.S. Pat. No. 6,697,195, hereby incorporated by reference herein. The combination of the two polarizers provides a high reflectivity of one polarization and high transmission for the perpendicular polarization for light incident on the reflective polarizer side of the combined polarizer, and high absorption and transmission for light of orthogonal polarizations incident on the dichroic polarizer side.

SUMMARY

In one exemplary implementation of the present disclosure, a hybrid polarizer includes an absorbing element having a first major surface and a second major surface. The hybrid polarizer also includes a first nearly uniaxial birefringent reflective polarizer disposed on the first major surface of the absorbing element, the first nearly uniaxial birefringent reflective polarizer having a first pass axis and a first block axis. The hybrid polarizer further includes a second birefringent reflective polarizer disposed on the second major surface of the absorbing element, the second reflective polarizer having a second pass axis and a second block axis.

In another exemplary implementation, a hybrid polarizer includes an absorbing polarizer having a pass axis and a block axis, a first major surface and a second major surface. The hybrid polarizer also includes a first nearly uniaxial birefringent reflective polarizer disposed on the first major surface of the absorbing polarizer, the first nearly uniaxial birefringent reflective polarizer having a first pass axis and a first block axis. The hybrid polarizer further includes a second birefringent reflective polarizer disposed on the second major surface of the absorbing polarizer, the second reflective polarizer having a second pass axis and a second block axis.

In yet another exemplary implementation of the present disclosure, a display device includes a display panel and a hybrid polarizer. The hybrid polarizer includes an absorbing element having a first major surface and a second major surface. The hybrid polarizer also includes a first nearly uniaxial birefringent reflective polarizer disposed on the first major surface of the absorbing element, the first nearly uniaxial birefringent reflective polarizer having a first pass axis and a first block axis. The hybrid polarizer further includes a second birefringent reflective polarizer disposed on the second major surface of the absorbing element, the second reflective polarizer having a second pass axis and a second block axis. The first and second pass axes of the first and second reflective polarizers are substantially aligned.

In yet another exemplary implementation of the present disclosure, a display device includes a display panel and a hybrid polarizer. The hybrid polarizer includes an absorbing element having a first major surface and a second major surface. The hybrid polarizer also includes a first birefringent reflective polarizer disposed on the first major surface of the absorbing element, the first nearly uniaxial birefringent reflective polarizer having a first pass axis and a first block axis. The hybrid polarizer further includes a second birefringent reflective polarizer disposed on the second major surface of the absorbing element, the second reflective polarizer having a second pass axis and a second block axis. The first and second pass axes of the first and second reflective polarizers are substantially aligned. The second reflective polarizer is disposed closer to the display panel than the first reflective polarizer and the second reflective polarizer comprises a plurality of layers characterized by a varying optical thickness and a majority of the layers having a smaller optical thickness are disposed closer to the display panel than the layers having a larger optical thickness.

These and other aspects of the polarizers and display devices of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

The present disclosure is believed to be applicable to hybrid polarizers, which may be suitable for use in display devices. When used in display devices, such as LCDs, hybrid polarizers according to the present disclosure may be used to achieve higher contrast and lower color-distortion. The term "hybrid polarizer" refers to a combination polarizer, including two reflective polarizers and at least one absorbing element in a (reflective polarizer)/(absorbing element)/(reflective polarizer) stack. The hybrid polarizer can further include additional optical elements. For example, additional absorbing elements, such as absorbing or dichroic polarizers, may be provided on one or both sides of the hybrid polarizer. Such constructions can provide high contrast display polarizers for either the back, the front, or both sides of a display panel, such as an LCD panel. For the purposes of the present disclosure, contrast of a polarizer is defined as a photopically averaged pass state transmission value divided by a photopically averaged block state transmission value of the polarizer. With an absorbing polarizer attached to a side of the hybrid polarizer that faces the viewer, the hybrid polarizer can serve the dual function of providing contrast to a display panel as well as recycling polarization for brightness enhancement.

The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

Figure 1:
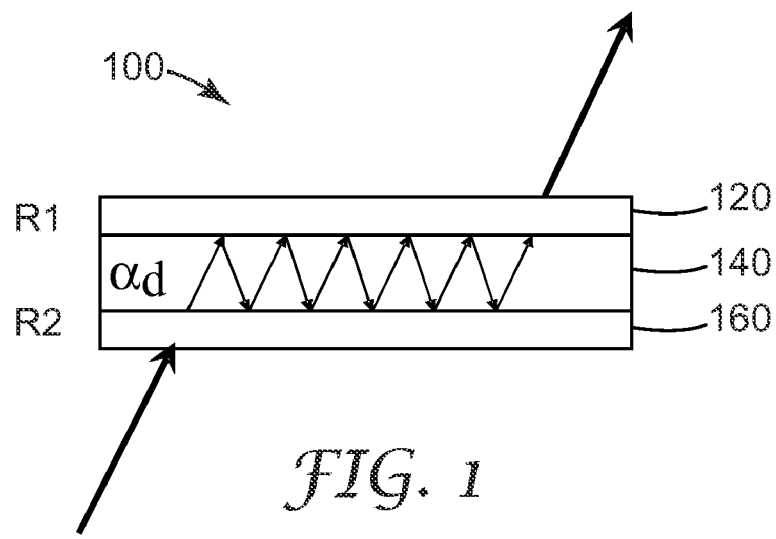
FIG. 1 shows schematically a cross-section of an exemplary hybrid polarizer of the present disclosure.

FIG. 1 shows a hybrid polarizer 100 according to one exemplary embodiment of the present disclosure, which includes an absorbing element 140 having a first major surface and a second major surface, a first reflective polarizer 120 disposed on the first major surface of the absorbing element 140, and a second reflective polarizer 160 disposed on the second major surface of the absorbing element. The absorbing element 140 may be a layer of any suitable material having non-zero absorption. The absorbing element may be isotropic or birefringent. In some exemplary embodiments, the absorbing element may be an absorbing polarizer having a pass axis and block axis. Light polarized along the pass axis of an absorbing polarizer is preferentially transmitted, while light polarized along the block axis of an absorbing polarizer is preferentially absorbed.

Each of the first and second reflective polarizers 120, 160 has a pass axis and a block axis (first and second, respectively). Light polarized along the pass axis of a reflective polarizer is preferentially transmitted, while light polarized along the block axis of a reflective polarizer is preferentially reflected. Preferably, the first and second pass axes of the first and second reflective polarizers are aligned as closely as possible or practicable. The degree of alignment will depend on a particular application. For example, the first and second pass axes may be aligned to within about +/−10 degrees, about +/−5 degrees, about +/−1 degree, about +/−0.5 degree, or even about +/−0.2 degree. In some exemplary embodiments including an absorbing polarizer, the pass axis of the absorbing polarizer may be aligned with the first pass axis, the second pass axis, or both, within the constraints described above.

Not intending to be bound by a particular theory, it is believed that the need for an absorbing element between the two reflective polarizers is due to the fact that, in the absence of any loss mechanism, half of the light that leaks through the first reflective polarizer eventually also leaks through the second reflective polarizer. This occurs due to the multiple reflections, which are illustrated schematically in FIG. 1. For example, if the first polarizer is 99% reflective and is non-absorbing, 1% of the block state polarization is transmitted. Upon summing the infinite number of multiple reflections with the binomial formula, it can be shown that half of this light leaks through the second reflective polarizer, if it is also lossless and 99% reflective. Thus, the block state reflectivity of two lossless 99% reflective polarizers is not 99.99%, but only 99.5%.

The equation for the overall transmission T of a two-reflector system (representing the reflectivities of light polarized along the block axes of two aligned reflective polarizers) with an absorbing element between the two, derived by summing the infinite series of multiple reflections between the two reflectors is:

$$T = \frac{T_1 * T_2 * e^{-\alpha d}}{1 - R_2 * R_2 * e^{2\alpha d}} \qquad \text{Equation 1}$$

where T1 and T2 are the transmissivity values of the two reflectors, and R1 and R2 are their corresponding reflectivities. The losses in the reflectors are assumed to be negligible. α and d are the absorption coefficient and thickness, respectively, of the absorbing element. Exp(−αd) is the internal transmission of the absorbing element. To a first approximation, small losses in the reflectors can be included in this term.

In one exemplary hybrid polarizer according to the present disclosure, the first and second reflective polarizers each have a reflectivity for light polarized along the first and second block axes not higher than about 90%. In such exemplary embodiments, absorption of the absorbing layer may be about 90% for light polarized in the block direction. In other exemplary embodiments, one or both reflective polarizers have a reflectivity for light polarized along the first and second block axes not higher than about 95, 96, 98 or 99%.

Figure 2:
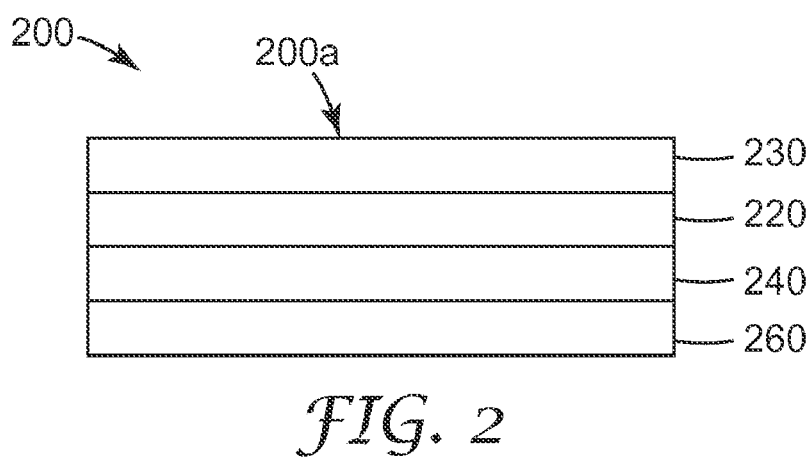
FIG. 2 shows schematically a cross-section of another exemplary hybrid polarizer of the present disclosure.

Another exemplary embodiment of a hybrid polarizer 200 constructed according to the present disclosure is shown in FIG. 2. The hybrid polarizer 200 includes an absorbing element 240 having a first major surface and a second major surface, a first reflective polarizer 220 disposed on the first major surface of the absorbing element 240, and a second reflective polarizer 260 disposed on the second major surface of the absorbing element. In some exemplary embodiments, the absorbing element 240 may be an absorbing polarizer having a pass axis and block axis. In other exemplary embodiments, the absorbing element 240 may be isotropic or nearly isotropic.

The hybrid polarizer 200 further includes an anti-reflective or anti-glare layer 230 disposed, for example, on the viewer side 200a of the hybrid polarizer 200 (i.e., the side of the hybrid polarizer that is intended to face a viewer when the hybrid polarizer is installed into a display device). The anti-reflective layer 230 may be another absorbing element, such as an absorbing polarizer having a pass axis and a block axis. In one exemplary embodiment, the anti-glare layer 230 is a relatively low contrast absorbing polarizer layer used to eliminate the glare from the viewer side 200a of the hybrid polarizer 200. The absorbing anti-glare layer also enables a contrast improvement. In such exemplary embodiments, the absorbing element disposed between the two reflective polarizers can have a lower contrast ratio than the anti-glare layer, to the point of being isotropic. The anti-glare or anti-reflective element 230 can be a layer including dyes coextruded with one or more of the other elements of the hybrid polarizer 200, or the anti-reflective element 230 may be coated or laminated onto another element of the hybrid polarizer 200.

Each of the first and second reflective polarizers 220, 260 has a pass axis and a block axis (first and second, respectively). Preferably, the first and second pass axes of the first and second reflective polarizers are aligned as closely as possible or practicable, as described above. In the exemplary embodiments where one or both of the elements 240 and 230 are absorbing polarizers, one or both of their pass axes may be aligned with the first pass axis, the second pass axis, or both within the constraints provided above.

Figure 3:
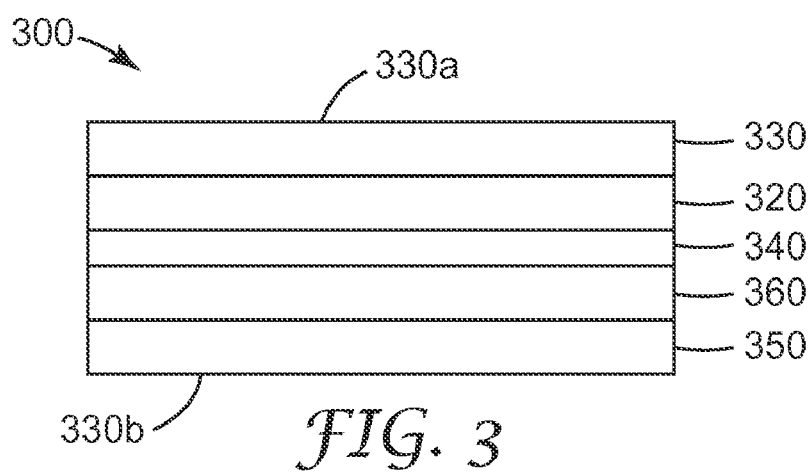
FIG. 3 shows schematically a cross-section of yet another exemplary hybrid polarizer of the present disclosure.

Yet another exemplary embodiment of a hybrid polarizer 300 constructed according to the present disclosure is shown in FIG. 3. The hybrid polarizer 300 includes an absorbing element 340 having a first major surface and a second major surface, a first reflective polarizer 320 disposed on the first major surface of the absorbing element 340, and a second reflective polarizer 360 disposed on the second major surface of the absorbing element. The hybrid polarizer 300 may or may not further include an anti-reflective or anti-glare element 330 disposed on the viewer side 300a of the hybrid polarizer 300. The hybrid polarizer 300 includes a rear absorbing element 350, which may be an absorbing polarizer. The rear absorbing element 350 is disposed on the back side 300b of the hybrid polarizer 300, which is opposite to the viewer side 300a. In some exemplary embodiments, one, two or all absorbing elements 330, 340 and 350 may be absorbing polarizers having a pass axis and block axis. One or both of the anti-glare element 330 and the rear absorbing element 350 may sometimes require a different absorber type or concentration than the absorbing element 340 between the reflecting polarizers.

The exemplary hybrid polarizer 300 may be used as the front (viewer side) display polarizer of a display device. The rear absorbing element 350 would minimize multiple reflections from elements in the display device and the hybrid polarizer. Each of the first and second reflective polarizers 320, 360 has a pass axis and a block axis (first and second, respectively). Preferably, the first and second pass axes of the first and second reflective polarizers are aligned as closely as possible or practicable. In the exemplary embodiments where one, two or all of the absorbing elements 330, 340 and 350 are absorbing polarizers, one, two or all of their pass axes may be aligned with the first pass axis, the second pass axis, or both within the constraints stated above.

Reflective Polarizer

Figure 4:
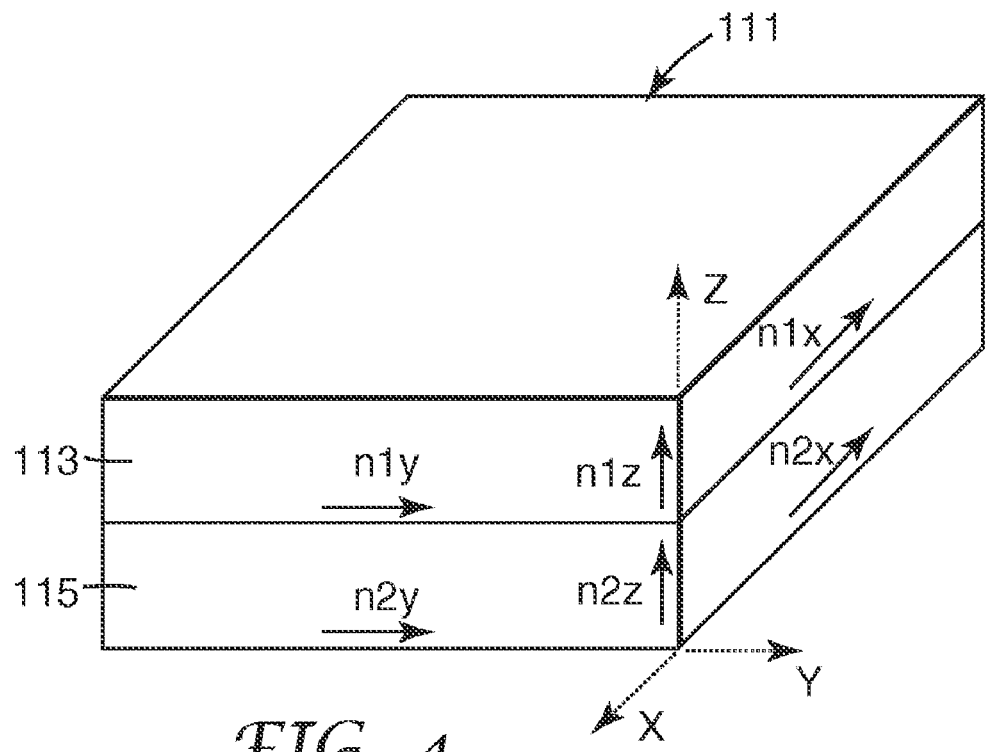
FIG. 4 is a schematic perspective view of a reflective polarizer according to the present disclosure.

One or both reflective polarizers used in exemplary hybrid polarizers according to the present disclosure may be birefringent reflective polarizers. FIG. 4 illustrates one exemplary embodiment of a reflective polarizer according to the present disclosure, which is a multilayer optical film 111 that includes a first layer of a first material 113 disposed (e.g., by coextrusion) on a second layer of a second material 115. The depicted optical film 111 may be described with reference to three mutually orthogonal axes x, y and z. Two orthogonal axes x and y are in the plane of the film 111 (in-plane, or x and y axes) and a third axis (z-axis) extends in the direction of the film thickness. One or both of the first and second materials may be birefringent.

While only two layers are illustrated in FIG. 4 and generally described herein, typical embodiments of the present disclosure include two or more of the first layers interleaved with two or more of the second layers. The total number of layers may be hundreds or thousands or more. In some exemplary embodiments, adjacent first and second layers may be referred to as an optical repeating unit. Reflective polarizers suitable for use in exemplary embodiments of the present disclosure are described in, for example, U.S. Pat. Nos. 5,882,774, 6,498,683, 5,808,794, which are incorporated herein by reference.

The optical film 111 may include additional layers. The additional layers may be optical, e.g., performing an additional optical function, or non-optical, e.g., selected for their mechanical or chemical properties. As discussed in U.S. Pat. No. 6,179,948, incorporated herein by reference, these additional layers may be orientable under the process conditions described herein, and may contribute to the overall optical and/or mechanical properties of the film, but for the purposes of clarity and simplicity these layers will not be further discussed in this application. For the purposes of the present disclosure, it is preferred that thick biaxially birefringent outer layers are not disposed on the side of the polarizer that faces a display panel. If thick outer layers are needed on the side of the polarizer that is intended to face the display once installed, such layers should be removable or they should be made of isotropic or only weakly biaxially birefringent materials.

In a birefringent reflective polarizer, the refractive indices of the first layers 113 ($n_{1x}$, $n_{1y}$, $n_{1z}$) and those of the second layers 115 ($n_{2x}$, $n_{2y}$, $n_{2z}$) are substantially matched along one in-plane axis (y-axis) and are substantially mismatched along another in-plane axis (x-axis). The matched direction (y) forms a transmission (pass) axis or state of the polarizer, such that light polarized along that direction is preferentially transmitted, and the mismatched direction (x) forms a reflection (block) axis or state of the polarizer, such that light polarized along that direction is preferentially reflected. Generally, the larger the mismatch in refractive indices along the reflection direction and the closer the match in the transmission direction, the better the performance of the polarizer.

To function well for wide angle viewing of a display device, a display polarizer should maintain high block state contrast for all angles of incidence and also maintain high pass transmission over all angles of incidence. As it has been shown in the commonly owned U.S. Pat. No. 5,882,774, pass state transmission increases when the refractive indices of the alternating first and second layers 113 and 115 are matched for light polarized along the z-axis and for light polarized along the y-axis. The z-index matching also ensures that the block state transmission does not degrade at high angles of incidence.

Preferably, at least one reflective polarizer in a hybrid polarizer according to the present disclosure is nearly uniaxial. For the purposes of the present disclosure, "nearly uniaxial" is defined as $\Delta n_{yz}=|n_y-n_z|$ being less than or equal to about 0.05 at 633 nm for a particular birefringent polarizer material. In some exemplary embodiments of nearly uniaxial birefringent reflective polarizers, $\Delta n_{yz}$ may be about 0.03 or less, about 0.02 or less, about 0.01 or less, or about 0.005 or less. More preferably, the first and second reflective polarizers of the hybrid polarizers constructed according to the present disclosure are both nearly uniaxial. Even more preferably, all components of the hybrid polarizer are either nearly uniaxial or substantially isotropic.

In other exemplary embodiments, at least one reflective polarizer in a hybrid polarizer may be biaxial, that is, having $\Delta n_{yz}$ of more than about 0.05 for a particular birefringent polarizer material. In other exemplary embodiments, $\Delta n_{yz}$ can be at least 0.08 or another suitable value depending on the application. In some exemplary embodiments, $\Delta n_{yz}$ can be no more than about 0.1. All values of refractive indices and refractive index differences are reported for 633 nm.

Figure 5:
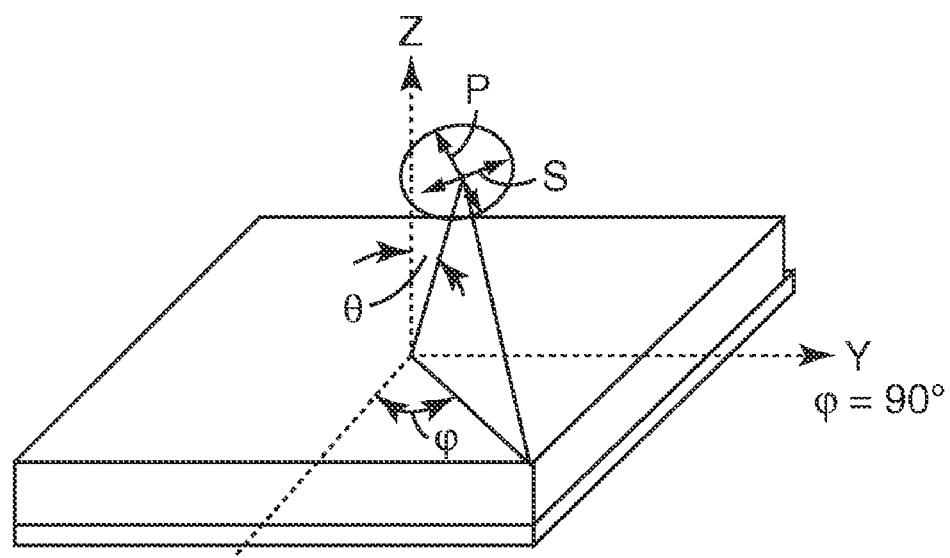
FIG. 5 is a schematic representation of light incident on a biaxial reflective polarizer at non-zero polar angles ($\theta$) and at azimuth angles ($\phi$) between 0 and 90 degrees.

Although biaxial reflective polarizers can have low reflectivity for light polarized parallel to the pass axis (y) for any angle of incidence, when light is incident onto the reflective polarizer at non-zero polar angles ($\theta$) and at azimuth angles ($\phi$) between 0 and 90 degrees (see FIG. 5), the magnitude of the reflectivity can oscillate dramatically as a function of both angle of incidence and wavelength of the incident light. This is believed to be at least in part due to unequal conversion of s-polarization to p-polarization and p-polarization to s-polarization as a function of wavelength as light traverses the biaxial medium. This phenomenon both increases appearance of undesirable color of the display device and lowers the contrast of the reflective polarizer when it is crossed with another reflective polarizer or with an absorbing polarizer. When a polarizer used in a display is crossed with another polarizer, a uniform extinction vs. wavelength spectrum is desired for all azimuths ($\phi$) from 0 to 360 degrees, i.e., not just for the planes of incidence parallel to the block and pass axes but for all azimuthal angles ($\phi$) between these axes.

The present disclosure provides a construction for a hybrid polarizer including a biaxial reflective polarizer that yields improved pass state transmission and improved contrast for all azimuthal angles at non-zero polar angles of incidence. This construction includes, for example, a biaxial reflective polarizer constructed of alternating low and high index layers, e.g., first and second layers 113 and 115, with the optical thickness of the repeat unit $d_1 \ast n_{x1}+d_2 \ast n_{x2}$ at normal incidence being of $\frac{1}{2}\lambda$ thickness and wherein the repeat units, as well as the constituent layers, are arranged such that a majority of the layers having a smaller optical thickness d*n (referred to as "blue" layers) are disposed closer to a display panel than the layers having a larger optical thickness (referred to as "red" layers). When such a polarizing film is crossed with itself or with an absorbing polarizer, the extinction is much better at more angles around the azimuth, if the blue layers are closest to the other polarizer.

Preferably, the profile of the optical thicknesses of the layers in the thickness direction of the reflective polarizer is a monotonic function, or at least, a majority of the layers characterized by a varying optical thickness are disposed such that their optical thicknesses decrease monotonically in the direction toward the display panel. However, in some exemplary embodiments, the function characterizing the profile of optical thicknesses of the layers in a biaxial reflective polarizer may have local minima and maxima. These minima and maxima can be disregarded, so long as the majority of the layers having a smaller optical thickness are disposed closer to the display panel than the layers having a larger optical thickness, as described in commonly owned U.S. patent application 3M, filed on even date herewith, the disclosure of which is incorporated by reference herein.

Other exemplary reflective polarizers suitable for use in hybrid polarizers according to the present disclosure are also described in U.S. Pat. No. 6,697,195, hereby incorporated by reference herein.

Absorbing Elements

An absorbing element can be stacked with reflective polarizers, laminated to one or more reflective polarizers, co-extruded with one or more reflective polarizers or coated onto and oriented with one or more reflective polarizers. In some exemplary embodiments, an entire (reflective polarizer)/(absorbing element)/(reflective polarizer) combination may be coextruded as a single film, or parts of it can be separately extruded and laminated, or first oriented and then laminated.

Generally, any optically absorbing structure can be used as the absorbing element depending, at least in part, on the desired wavelengths of absorption and transmission. One example of an absorbing element includes a layer of light absorbing material, such as, for example, dye, pigment, or ink disposed in a supporting matrix or on a supporting substrate.

Suitable absorbing elements include glass filters, such as those obtainable from Schott Glass Technologies, Inc., Duryea, Pa., including the KG series of heat control filters which absorb strongly in the near infrared but are relatively transparent in the visible. Gentex Corporation (Carbondale, Pa.) makes plastic optical filters under the trade name Filtron™. In addition, polycarbonate or acrylic sheets loaded with dyes absorb at various wavelengths across the visible and IR. Suitable IR and visible absorbing dyes include dyes with good thermal stability that can be injection molded with, for example, polycarbonate. Other suitable dyes have broad solubility and are recommended for solution coating. Alternative absorbing materials include pigments such as carbon black and iron oxides, such as iron oxide-loaded glass.

The selection of the light absorbing material can be made based on factors, such as, for example, the absorbance spectrum of the light absorbing material, cost, processibility, stability, and compatibility with other elements in the optical filter. A light absorbing material may be selected with an average absorptance of at least about 5%, 10%, 20%, 30%, or 50% over the wavelength range that is to be reflected/absorbed. The light absorbing material may have a relatively low average absorptance (e.g., no more than 40%, 20%, 10%, 5%, or 1%) over the wavelength range where transmission is desired. It will be appreciated, however, that many light absorbing materials suitable for broadband absorptive elements have substantial absorbance over a relatively wide range of wavelengths or a relatively constant absorptance value over portions of both the transmission and reflection wavelength ranges. The use of the combination of an absorptive element between two reflective polarizers can allow the use of lower loadings of light absorbing material than if the absorptive element was used alone or with a single reflective element.

Many other types of lossy elements can be used, including, for example, lossy elements that employ scattering or a combination of scattering and absorption. For example, depending on particle size, pigments or other particles used in the optical filters can scatter light rays. Although this may introduce additional haze, a scattering loss is typically equivalent to an absorptive loss. Generally, scattering is only slowly wavelength dependent and is typically stronger for shorter wavelengths. Scattering can be polarization dependent based on the shape of the scattering particles.

As mentioned above, absorbing polarizers are also suitable for use in exemplary embodiments of the present disclosure. One useful polarizing absorptive element is an oriented, dye-containing, polyvinyl alcohol (PVA) film. Examples of such films and their use as polarizing absorptive elements are described, for example, in U.S. Pat. Nos. 4,895,769, and 4,659,523 and PCT Publication No. WO 95/17691, all of which are incorporated herein by reference. To function as an absorbing polarizer, the polyvinyl alcohol film is typically stretched to orient the film. When stained with a polarizing dye or pigment, the orientation of the film determines the optical properties (e.g., the axis of extinction) of the film. Preferably, the absorbing element is such that absorption of light polarized along the block axis does not decrease (and sometimes increases) with increased angle of incidence. One example of such absorbing elements are absorbing polarizers including supra-molecular lyotropic liquid-crystalline material, as described in Lazarev et al. article, entitled "Low-leakage off-angle in E-polarizers, Journal of the SID 9/2, pp. 101-105 (2001), incorporated by reference herein.

Absorbing polarizers used in exemplary embodiments of the present disclosure have a contrast ratio of less than 1000:1, thus making the contribution of the reflective polarizers more important. In some exemplary embodiments, the contrast ratios of absorbing polarizers may be about 500:1 or less, about 100:1 or less, about 10:1 or less, or about 5:1 or less. In some exemplary embodiments, the absorbing polarizer may be characterized by a contrast ratio of about 5:1 to about 100:1.

Where the absorbing polarizer of the reflective/absorbing/reflective polarizer combination has a contrast ratio of up to about 10:1, at least one of the reflective polarizers preferably has a contrast of at least about 100:1. In other exemplary embodiments, one or both of the biaxial reflective polarizers may be characterized by a contrast ratio of at least about 50:1, at least about 100:1 or at least about 200:1. The reflective/absorbing/reflective polarizer combination according to the present disclosure may have a total contrast ratio of about 500:1 or more or about 1000:1 or more. In some exemplary embodiments, the contrast ratio of the reflective/absorbing/reflective polarizer combination according to the present disclosure may be as high as about 10,000:1.

Display Devices Including Hybrid Polarizers

Hybrid polarizers described above are believed to be useful in several types of display devices, such as LCDs. They can function as a replacement for high performance absorbing polarizers on either the viewer side or the rear side of a display panel. When the construction shown in FIG. 2 is used on the rear side of a display panel, the hybrid polarizer can function as both a display polarizer and a backlight polarization recycling film. The construction of FIG. 2 can also be used as a viewer side polarizer of a display panel to recycle unused light from off-state pixels to the backlight in order to provide for increased brightness to the on-state pixels.

Figure 6:
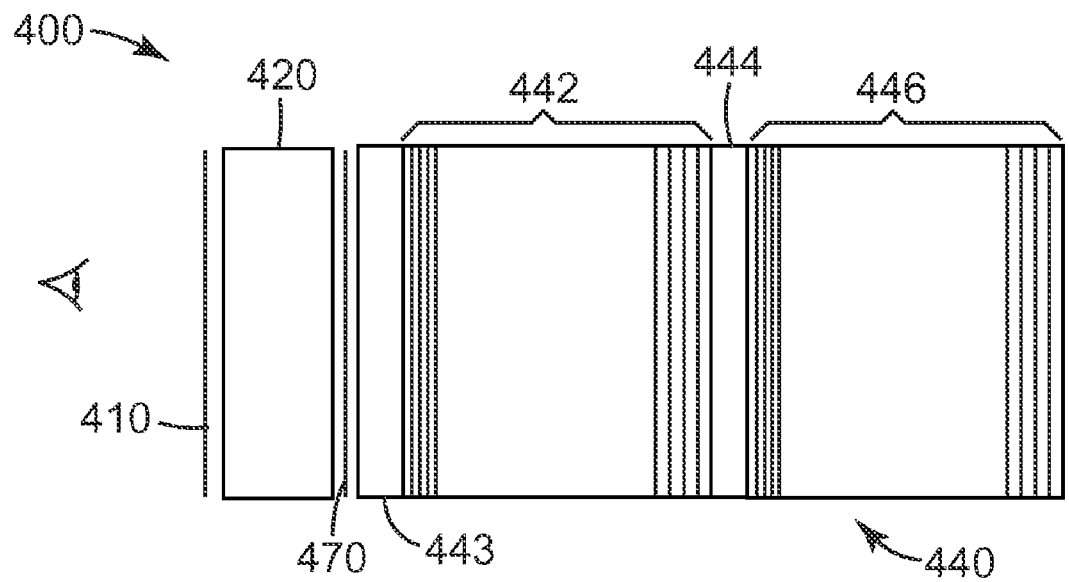
FIG. 6 is a schematic representation of a display device according to one exemplary embodiment of the present disclosure.

With a hybrid polarizer construction, the reflective polarizer of the three polarizer stack that is adjacent the display should be arranged to have the blue to red layer construction just described, with the blue layers closest to the display panel. The construction of the other reflective polarizer, on the opposite side of the absorbing layer, is not as important. An exemplary display device 400 having a hybrid polarizer 440 disposed on the rear side of a display panel 420 is illustrated in FIG. 6, where the viewer is on the left. As shown, the hybrid polarizer 440 includes an absorbing element 444 having a first major surface and a second major surface, a first birefringent reflective polarizer 446 disposed on the first major surface of the absorbing element and a second birefringent reflective polarizer 442 disposed on the second major surface of the absorbing element, and an anti-reflective element 443 disposed on the viewer side of the hybrid polarizer 440. Those of ordinary skill in the art will readily appreciate that the hybrid polarizer 440 may have any of the configurations shown in FIGS. 1-3.

In this exemplary embodiment, the second reflective polarizer 442 is disposed closer to the display panel than the first reflective polarizer 446, but in other exemplary embodiments, the order may be reversed. Preferably, the reflective polarizer that is disposed closer to the display panel includes a plurality of layers characterized by a varying optical thickness, in which a majority of the layers having a smaller optical thickness are disposed closer to the display panel than the layers having a larger optical thickness. The display device 400 further includes a compensation film 470 and an additional display polarizer 410.

Figure 7:
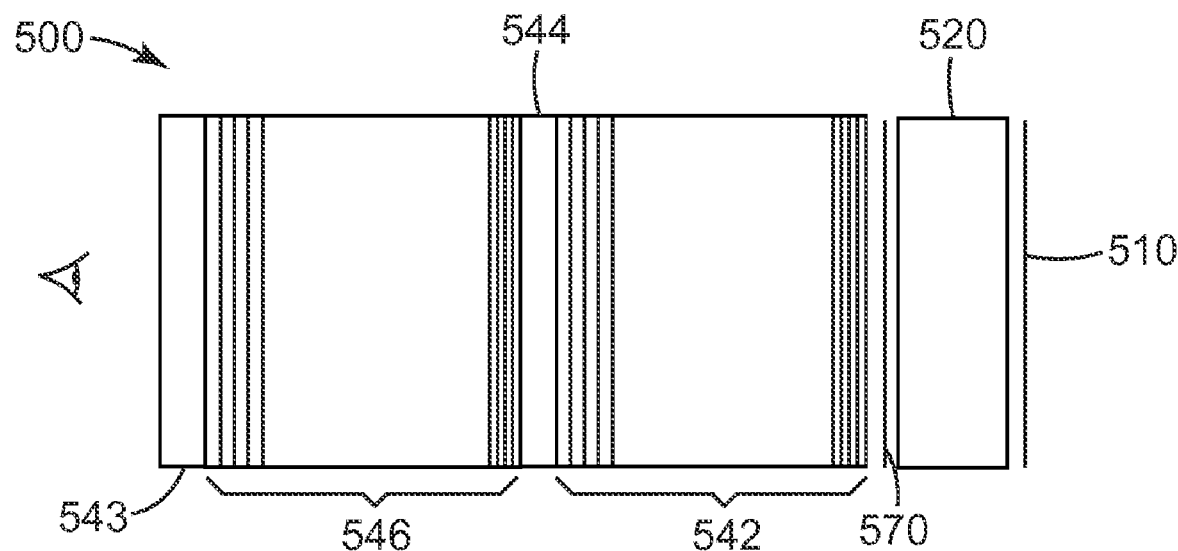
FIG. 7 is a schematic representation of a display device according to another exemplary embodiment of the present disclosure.

Another exemplary display device 500 having a hybrid polarizer 540 disposed on the viewer side of a display panel 520 is illustrated in FIG. 7, where the viewer is on the left. As shown, the hybrid polarizer 540 includes an absorbing element 544 having a first major surface and a second major surface, a first reflective polarizer 546 disposed on the first major surface of the absorbing element and a second reflective polarizer 542 disposed on the second major surface of the absorbing element, and an anti-reflective element 543 disposed on the viewer side of the hybrid polarizer 540. Those of ordinary skill in the art will readily appreciate that the hybrid polarizer 540 may have any of the configurations shown in FIGS. 1-3.

In this exemplary embodiment, the second reflective polarizer 542 is disposed closer to the display panel than the first reflective polarizer 546, but in other exemplary embodiments, the order may be reversed. Preferably, the reflective polarizer that is disposed closer to the display panel includes a plurality of layers characterized by a varying optical thickness, in which a majority of the layers having a smaller optical thickness are disposed closer to the display panel than the layers having a larger optical thickness. The display device 500 further includes a compensation film 570 and an additional display polarizer 510. The additional polarizer 410 or 510 may also be a hybrid polarizer according to the present disclosure.

Typically the compensation film 470, 570 may be disposed between the display panel 420, 520 and the hybrid polarizer 440, 540, between the display panel 420, 520 and the additional polarizer 410, 510, or both. One example of a suitable compensation film is a biaxial birefringent film. One type of a biaxial birefringent film is termed a "D-plate", an example of which is the NRZ™ film available from Nitto Denko Corporation of Osaka, Japan. Such a film has an out of plane retardation $R_{th}$ that is approximately 0, where $R_{th}$ is given by $R_{th}=[(n_x+n_y)/2-n_z]*thickness$. That is, the z-index of the D-plate is approximately equal to the average of the x and y indices of refraction of the film. A typical D-plate compensation film also has an in-plane retardation $R_0=(n_x-n_y)*thickness$ that is approximately equal to ½λ, where λ is in the wavelength range of interest. The compensation film(s) also may be designed to correct for angle-dependent retardation of the LC material. To this end, additional retardance, in an amount equal but opposite in sign to the LC material, is added to the compensation layer(s) to correct for the retardance of the LC material in a complete LC display panel.

Exemplary display devices according to the present disclosure may include a backlight as known to those of skill in the art. In the exemplary embodiments including a backlight, a hybrid polarizer may be disposed between the backlight and the display panel. The configuration of the backlight is not limited to any specific construction. Any suitable structure capable of providing light to the display panel may be used. Suitable examples of backlights include, without limitation, edge-lit backlights including one or more light sources optically coupled to one or more edges of one or more lightguides, and direct-lit backlights including one or more light sources disposed such that the display panel is disposed between the one or more light sources and a viewer, that is, directly behind the display panel in the field of view of a viewer of the display. In the exemplary embodiments including a back reflector and no backlight, the hybrid polarizer may be disposed between the reflector and the display panel.

Other optical elements and films may be included into display devices according to the present disclosure as would be known to those of ordinary skill in the art. Exemplary suitable additional optical elements include, without limitation, structured surface films. Examples of structured surface films include films having a plurality of liner prismatic surface structures, a plurality of lenticular surface structures, a matrix or a random array of surface structures, and others. Another type of an optical film suitable for use in displays of the present disclosure are optical films including a layer including beads dispersed in a binder. Similarly, diffuser films used to increase the uniformity of illumination could also be disposed at various locations such as between the backlight and the biaxial reflecting polarizer film. Such films may be disposed between the backlight and the biaxial reflective polarizer or at another suitable location.

Exemplary hybrid polarizers of the present disclosure may be capable of providing contrast of 10,000:1, which would be exceptionally valuable in projection displays, either as a polarizing beamsplitter or a prepolarizer. For such applications, the preferred construction would be the one illustrated in FIG. 1.

Bandwidth

Although most LCD displays are broadband, i.e., they control the transmission of most wavelengths of visible light, hybrid polarizers of the present disclosure can be either broadband or narrow band. For example, hybrid polarizers according to the present disclosure and can operate in the UV, visible, or infrared portions of the spectrum, or in any combination of the three. The bandwidth of the absorbing elements and the anti-glare elements typically need only absorb over the range of wavelengths to which the reflective polarizers are tuned, but may be broader or narrower than those ranges, depending on the application. The two reflective polarizers would typically operate over the same range of wavelengths, but may be wavelength shifted with respect to each other as desired. For example, the two reflective polarizers may be wavelength shifted so that identical spectral leaks do not align.

EXAMPLES

The examples below explore some of the performance characteristics of a hybrid polarizer including a dichroic dye absorbing polarizer disposed between two multilayer reflective polarizers.

Example 1

A construction shown in FIG. 1 was produced, using Advanced Polarizer Film (APF), available from 3M Company, as reflective polarizers. A suitable APF film has been described, for example in the Invited Paper 45.1, authored by Denker et al., entitled "Advanced Polarizer Film for Improved Performance of Liquid Crystal Displays," presented at Society for Information Displays (SID) International Conference in San Francisco, Calif., Jun. 4-9, 2006.

Each APF reflective polarizer was made of 275 alternating layers of 90/10 coPEN, a polymer composed of 90% polyethylene naphthalate (PEN) and 10% polyethylene therephthalate (PET), and a low index isotropic layer, which was made with a blend of polycarbonate and copolyesters such that the index is about 1.57 and remains substantially isotropic upon uniaxial orientation of the coPEN. The absorbing layer was made with a magenta dichroic dye mixed with PVA, which was then coated onto a PET cast web and then uniaxially oriented in a batch stretcher. The dichroic coated PET layer was then laminated between the two APF films with the block axes of all three parallel to one another.

Figure 8:
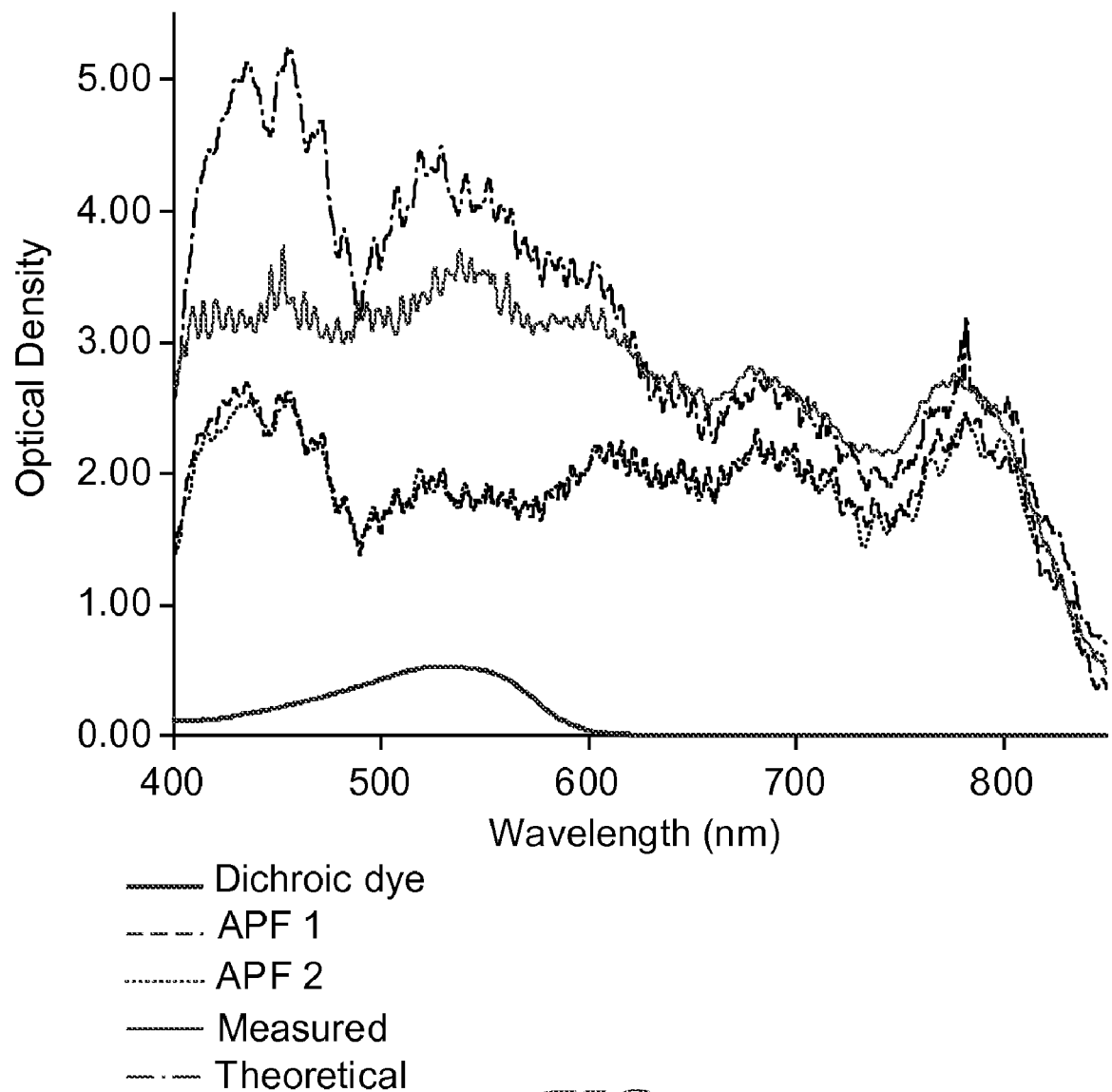
FIG. 8 is a chart showing optical density vs. wavelength of an exemplary hybrid polarizer of the present disclosure and its components.

Using Equation 1, the predicted optical density (OD, here defined as −Log(T)) was calculated and is shown in FIG. 8 as the Theoretical OD. The OD of the laminate, measured in a Perkin Elmer λ-19 spectrophotometer against an integrating sphere, is shown in the chart as the Measured OD. The samples were measured with pre-polarized light from a Glan-Thompson crystal polarizer. The transmission of each of the three polarizers in the hybrid stack was also measured. The chart in FIG. 8 shows the measured transmission spectrum of the two reflective polarizers, referred to as APF1 and APF2, and of the absorbing layer, referred to as Dichroic dye.

Several things can be noted from this chart. In the region of longer wavelengths, the dye has essentially zero absorption, so the OD of the combined polarizers is only a little more than that of one reflective polarizer, as predicted by equation 1. The measured OD is slightly higher than theoretical, which implies that there is a small amount of loss in the laminate, which may be due to either scattering or absorption, or both. At shorter wavelengths, where the dye is absorbing and the reflective polarizers have higher OD, the theoretical OD is quite high. However, the measured OD is lower, although a peak OD of about 3.5 was obtained. The sample was then re-measured with a cleanup polarizer oriented parallel to the pass state direction. The measured OD then was equal to or above the theoretical values. Since no measurable pass state light was incident on the laminate from the crystal polarizer, this implies that some of the block state light was converted to pass state light. This is indicative of scattering in the films, which depolarizes some of the incident light.

Example 2

Figure 9:
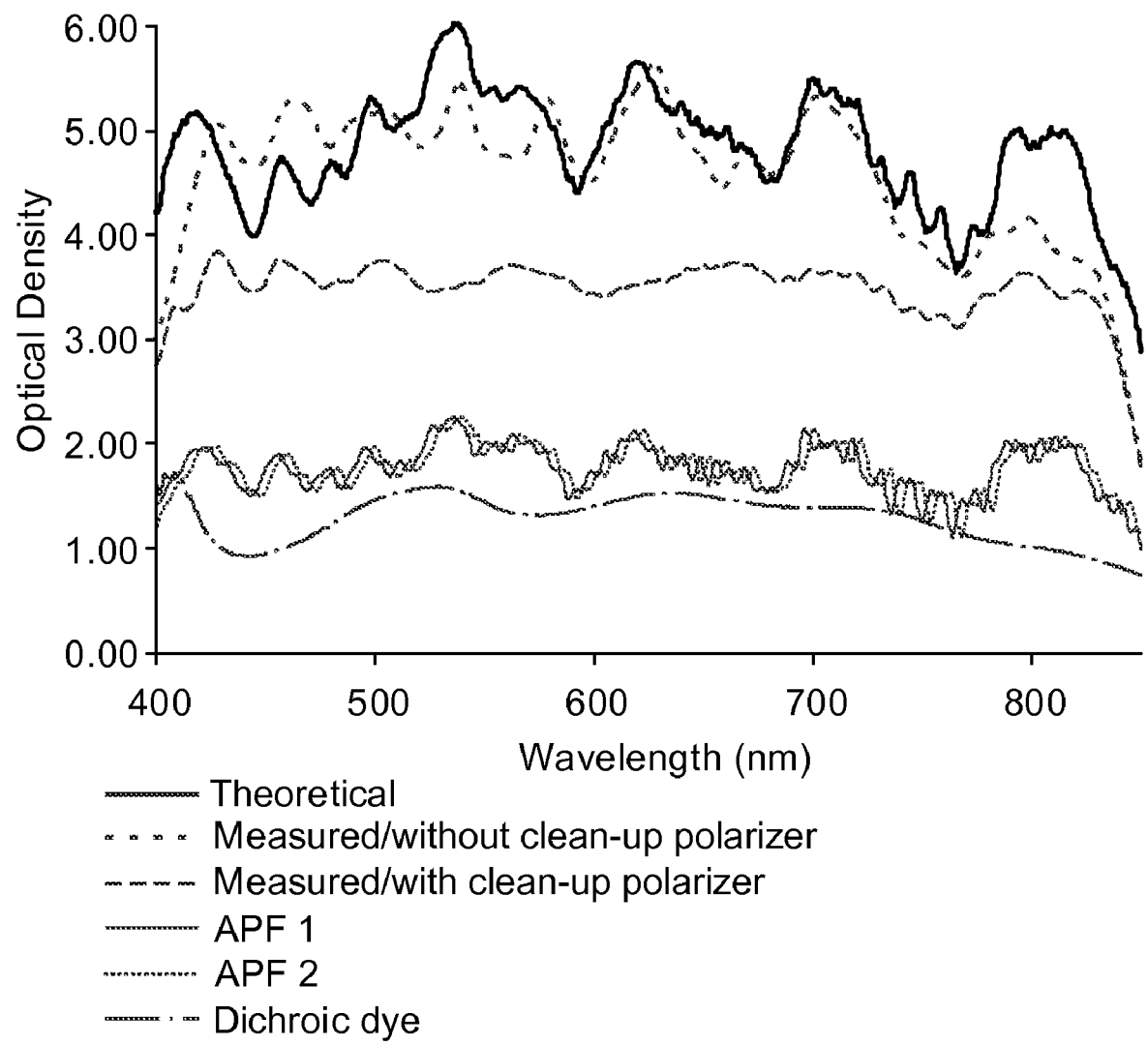
FIG. 9 is a chart showing optical density vs. wavelength of another exemplary hybrid polarizer of the present disclosure and its components.

For this sample, two slightly less reflective APF films were laminated to a broadband absorbing polarizer, which had between 90% and 95% absorption of block state light. The absorbing polarizer was made by coating a mixture of red, green and blue lyotropic dyes onto a polymethyl methacrylate (PMMA) film. The water soluble lyotropic dyes were oriented by the shearing action in coating process and then immediately dried. The OD of the absorbing polarizer is shown in FIG. 9, labeled as "dichroic dye." As in the previous example, the OD of the laminate was calculated using equation 1 and is plotted as the theoretical OD. The OD of the laminate was measured with a Perkin-Elmer λ-950 spectrophotometer with light, which was pre-polarized by a Glan-Thompson polarizer. Spectra were obtained with and without a cleanup polarizer as in the previous example. The average OD is about 3.7 without the clean-up polarizer and is about 5.0 with the clean-up polarizer. The latter approximately matches the theoretical value. The difference between the two can again be ascribed to scattering and depolarization of the polarized measurement beam. In order to minimize scattering, the material should be made with as clean a resin as possible, and scattering due to polymer crystallites should also be minimized. The latter can be effected with the use of birefringent copolymers as copolymers tend to have smaller crystal sizes than homopolymers. As in known in the art, orientation conditions can also affect the crystallite size in the polymer.

Comparative Example 3

Figure 10:
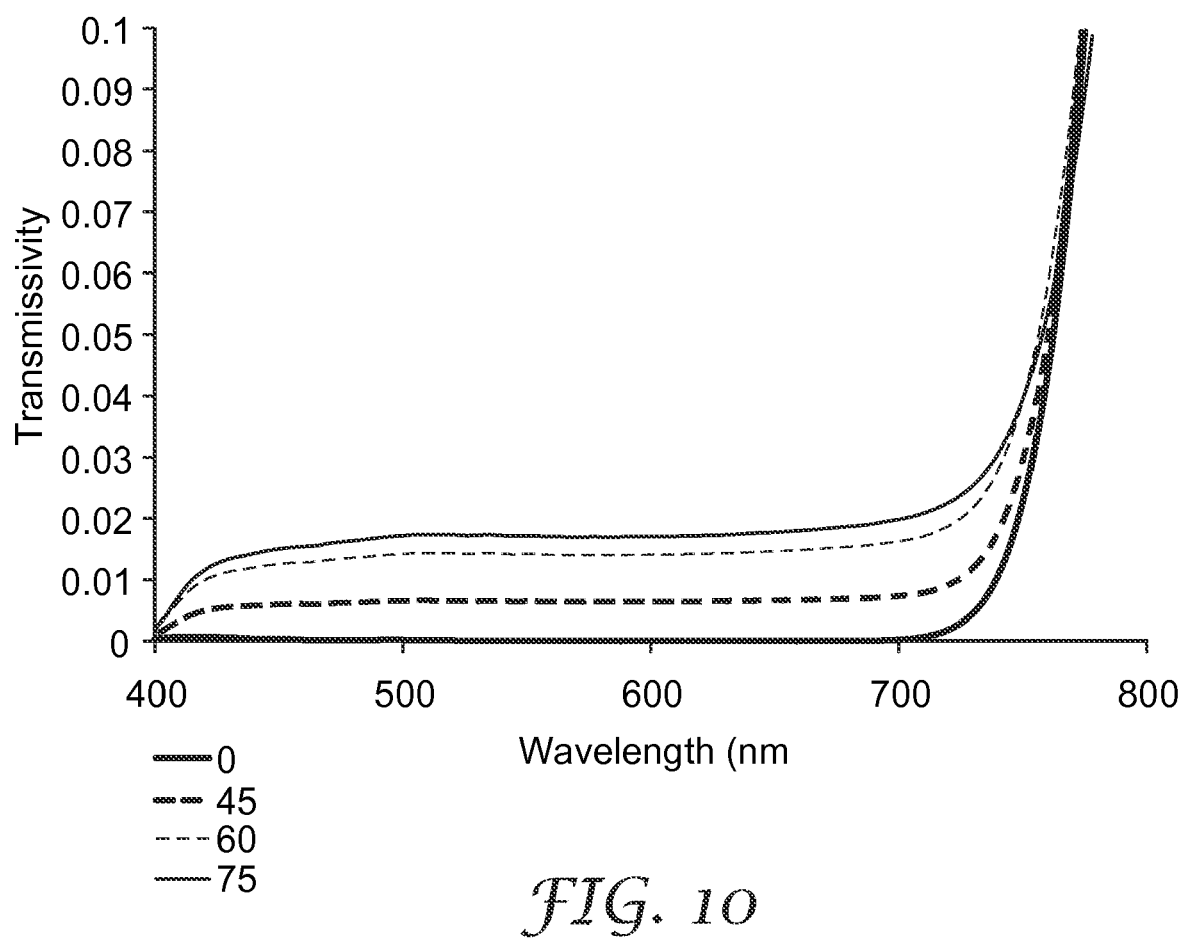
FIG. 10 shows a plot of transmissivity of crossed absorbing polarizers as a function of wavelength for angles of incidence from 0 to 75 degrees at the azimuth angle of 45 degrees.

The data in FIGS. 8 and 9 were obtained at near-normal incidence. However, an LCD comprising crossed polarizers should have a high contrast at all angles of incidence and azimuth. In this Comparative Example, the transmission of crossed absorbing polarizers was calculated as a function of wavelength for angles of incidence from 0 to 75 degrees. Thick protective layers made from a birefringent material such as cellulose triacetate (TAC) were not included in the modeled polarizer construction. The plane of incidence was at the azimuth angle of 45 degrees. These spectra are shown in FIG. 10. Note that the average visible light transmission at 60 degrees is about 1.5%, which is the value typically observed with crossed absorbing polarizers.

Figure 11:
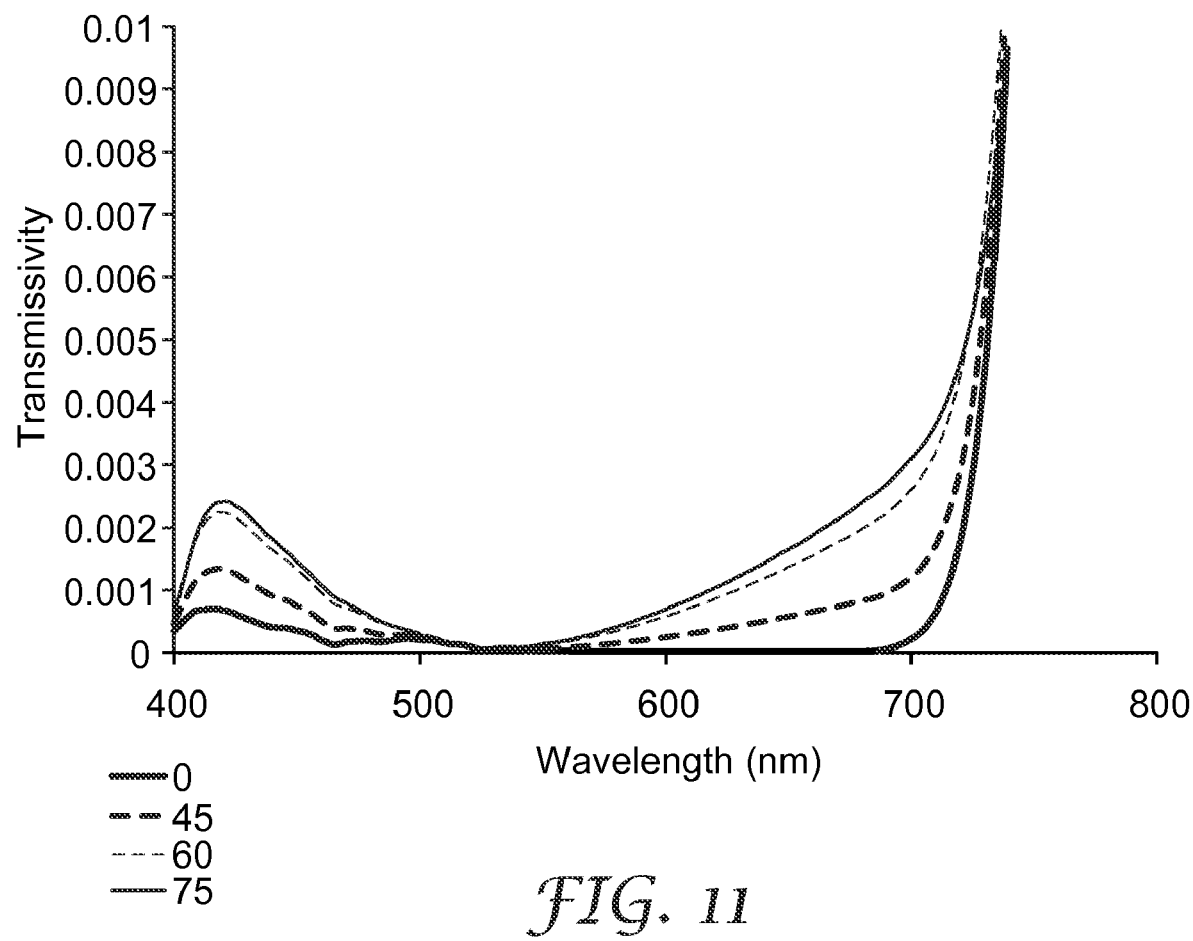
FIG. 11 shows a plot of transmissivity of a D-plate between crossed absorbing polarizers as a function of wavelength for angles of incidence from 0 to 75 degrees at the azimuth angle of 45 degrees.

The insertion of a D-plate between the two absorbing polarizers dramatically reduces the transmission of light at the higher angles of incidence. This result is illustrated in FIG. 11, which has 10× expanded scale as compared to FIG. 10. The photopic weighted visible light transmissivity at 60 degrees is now only about 0.0005, which is much less than the value of 0.015 illustrated in FIG. 10 for the case with no compensation. Approximately the same transmission, or lower, is obtained for other azimuthal angles.

The D-plates used in this and the following modeled examples were assumed to have an in-plane retardance of ½λ at 530 nm and were assumed to be made of a material with the nominal indices and dispersion values of polycarbonate. The thickness of the plate was assumed to be 10 microns and the in-plane indices were assumed to be $n_x=1.592$ and $n_y=1.566$ at 633 nm. Given these in-plane indices, the ideal D-plate has a value of $n_z=1.579$.

Example 4

Transmissivity of a hybrid polarizer having the construction of FIG. 6, using APF for the two reflective polarizers, and crossed with one of the absorbing polarizers of the previous comparative example, was modeled at the azimuth angle of 45 degrees in the same manner as described above. The high refractive index layers were assumed to have a y-z index mismatch of about 0.015. Both the absorbing layer between the APF structures, as well as the anti-reflective (AR) top layer, are assumed to have the same real indices as the high refractive index layers of the APF but have the same imaginary (absorbing) indices as the absorbing polarizers. The absorbing layer was assumed to have an absorption of about 50% of block state polarization and the anti-reflective layer was assumed to have an absorption of about 80% of light with the block state polarization.

Figure 12:
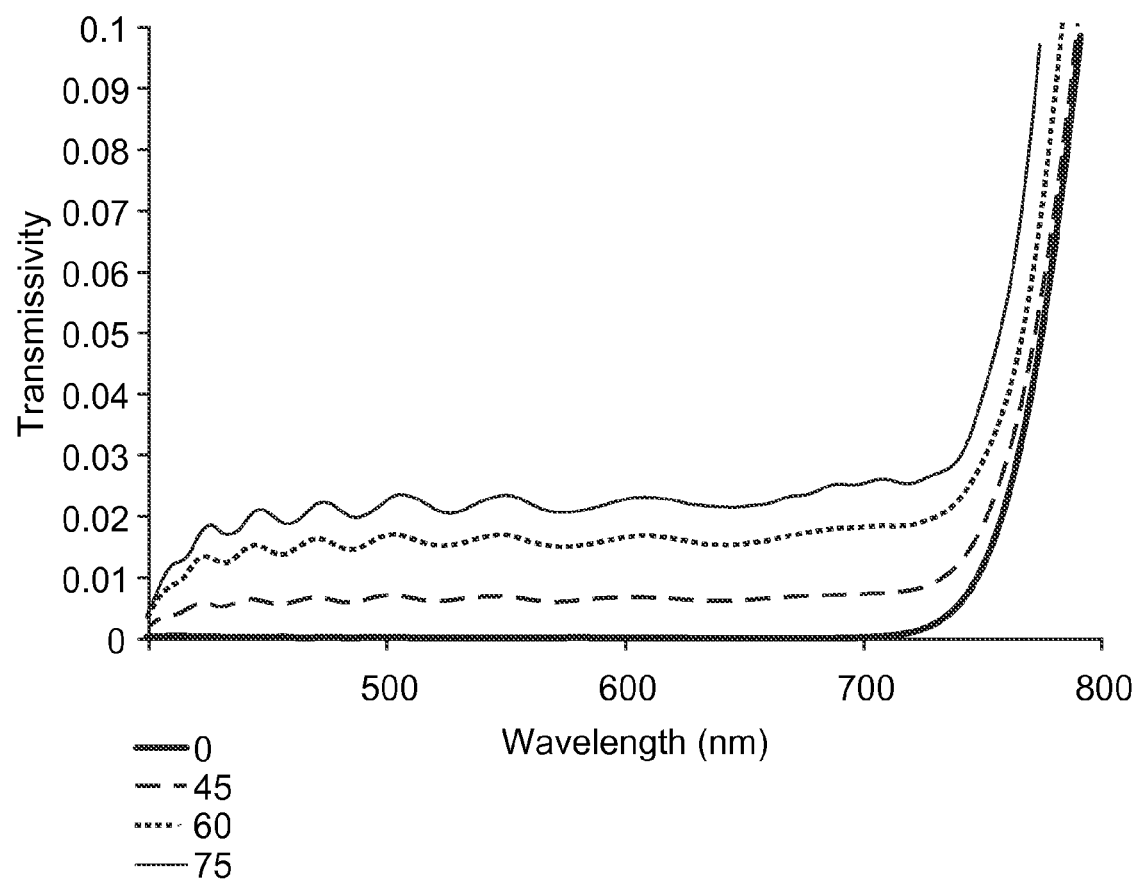
FIG. 12 shows a plot of transmissivity of a crossed absorbing polarizer and a hybrid polarizer according to the present disclosure as a function of wavelength for angles of incidence from 0 to 75 degrees at the azimuth angle of 45 degrees.
Figure 13:
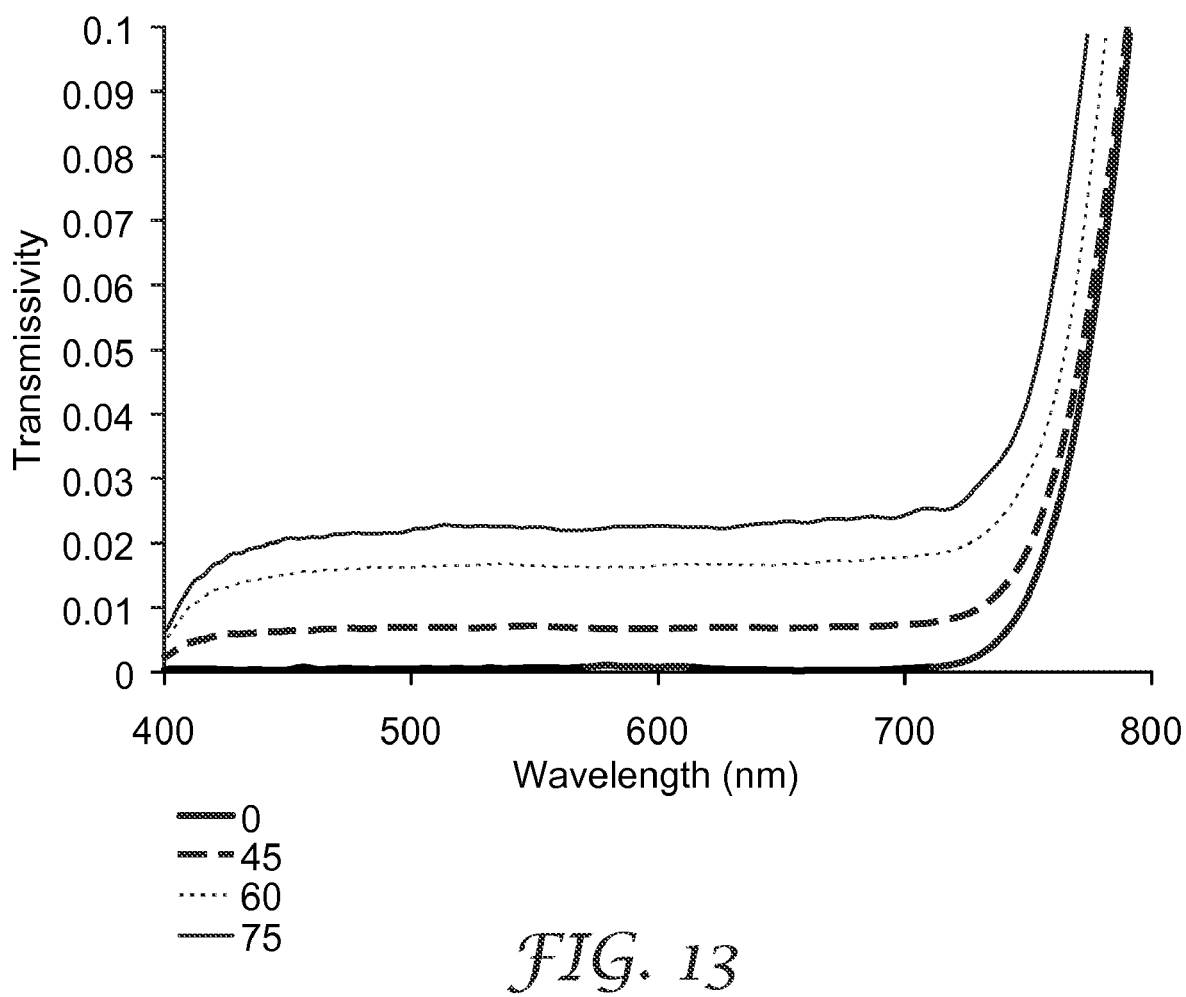
FIG. 13 shows a plot of transmissivity of a crossed absorbing polarizer and another exemplary hybrid polarizer according to the present disclosure as a function of wavelength for angles of incidence from 0 to 75 degrees at the azimuth angle of 45 degrees.

The spectra without a D-plate between the crossed polarizers are shown in FIG. 12. Note that the spectra are similar to those in FIG. 10 for absorbing polarizers, except for some ripple in the spectra at high angles of incidence. This ripple was found to be due to the biaxial nature of the anti-reflective layer. If this anti-reflective layer is replaced with a nearly uniaxial layer such as a PVA iodine polarizer layer with the same absorptivity, the spectra of FIG. 13 are obtained. Note that these are also slightly higher than the values in FIG. 10 for the crossed absorbing polarizers. However, if all layers of the hybrid polarizer are assumed to be true uniaxial, approximately the same result is obtained as in FIG. 10.

Figure 14:
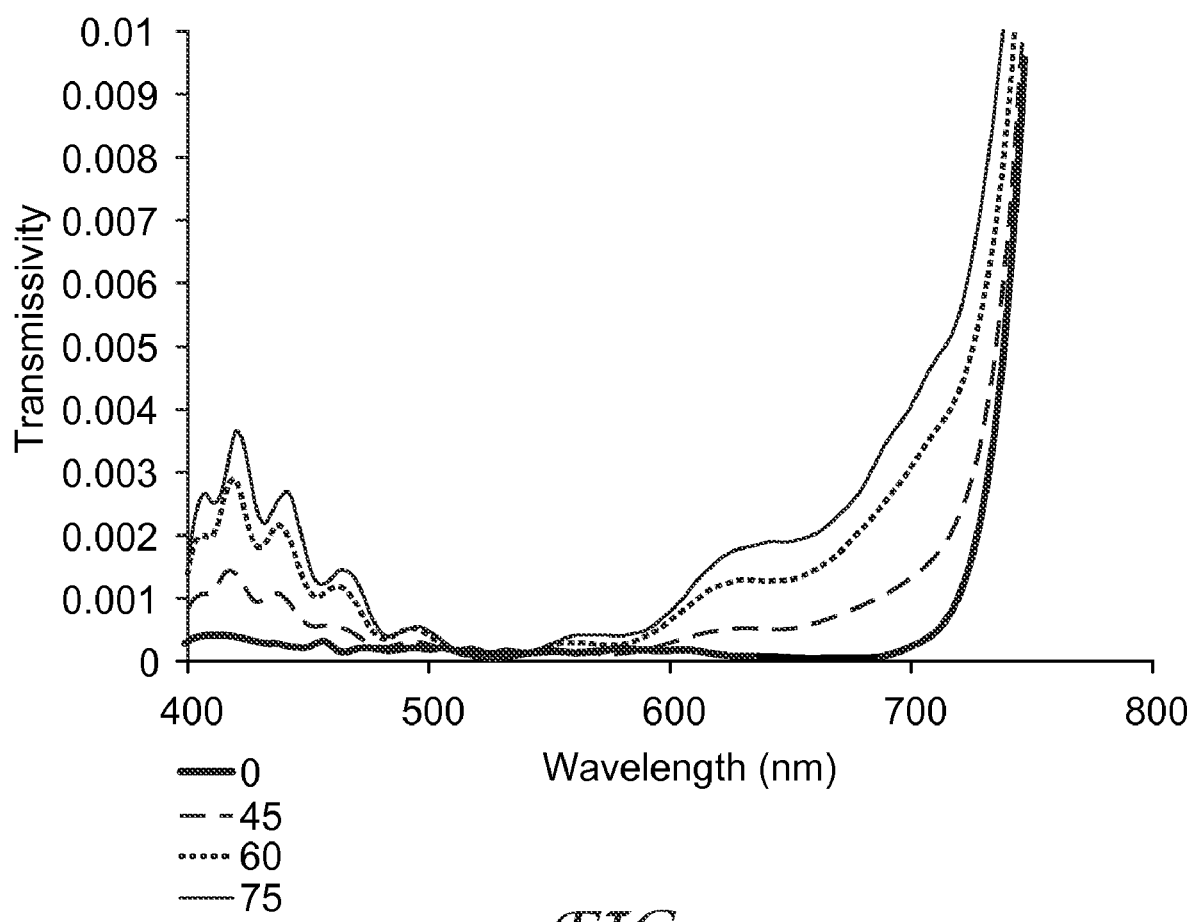
FIG. 14 shows a plot of the same characteristics for the same polarizers as in FIG. 12, except that a D-plate is inserted between the polarizers.
Figure 15:
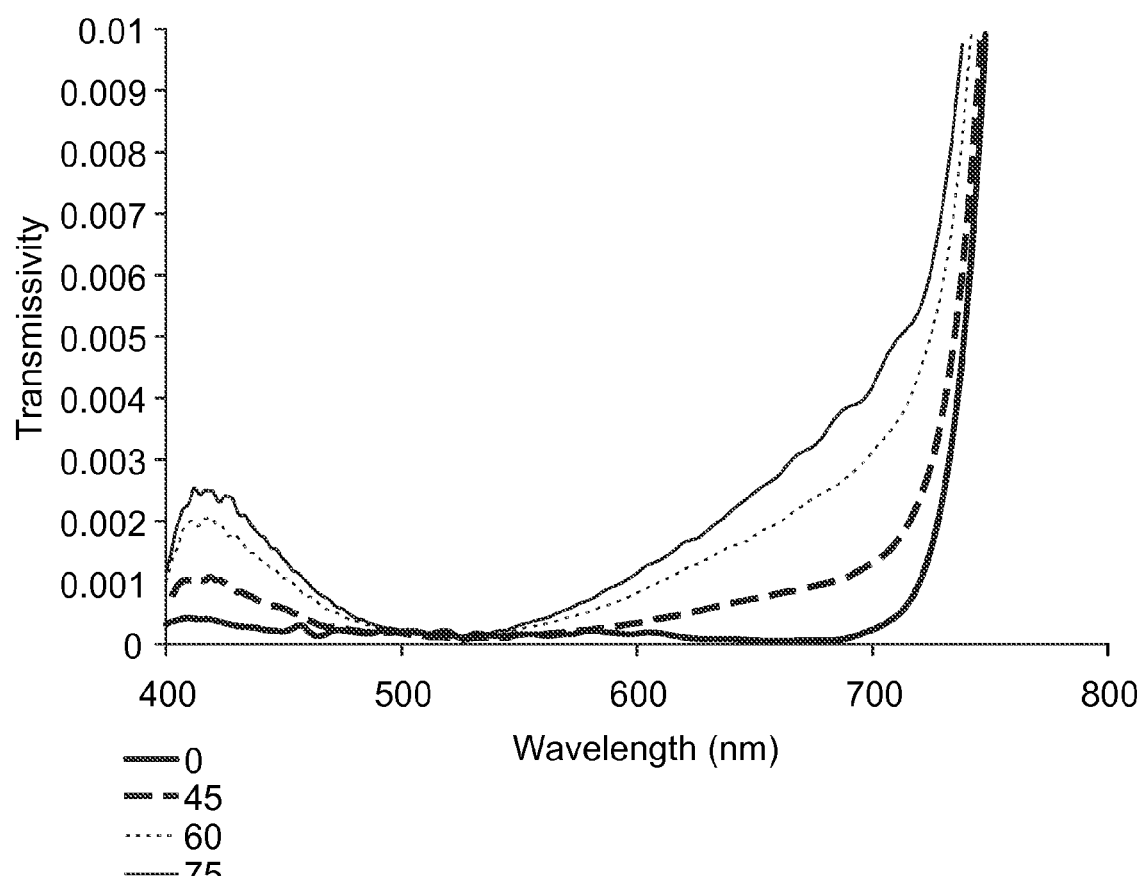
FIG. 15 shows a plot of the same characteristics for the same polarizers as in FIG. 13, except that a D-plate is inserted between the polarizers.

When a D-plate is inserted between the polarizers, however, the transmission, shown in FIGS. 14 and 15 for the two cases just described, drops to about the values observed for the crossed absorbing polarizers. Note that for the case with a uniaxial AR layer, shown in FIG. 15, the spectra are almost identical to those of crossed absorbing polarizers. As in the case above for absorbing polarizers, approximately the same or lower transmission is calculated for more azimuthal angles. This shows that a hybrid polarizer constructed with a very low contrast AR layer can be used in a display to produce high contrast over a wide range of viewing angles similar to high performance absorbing polarizers.

Example 5

Figure 16:
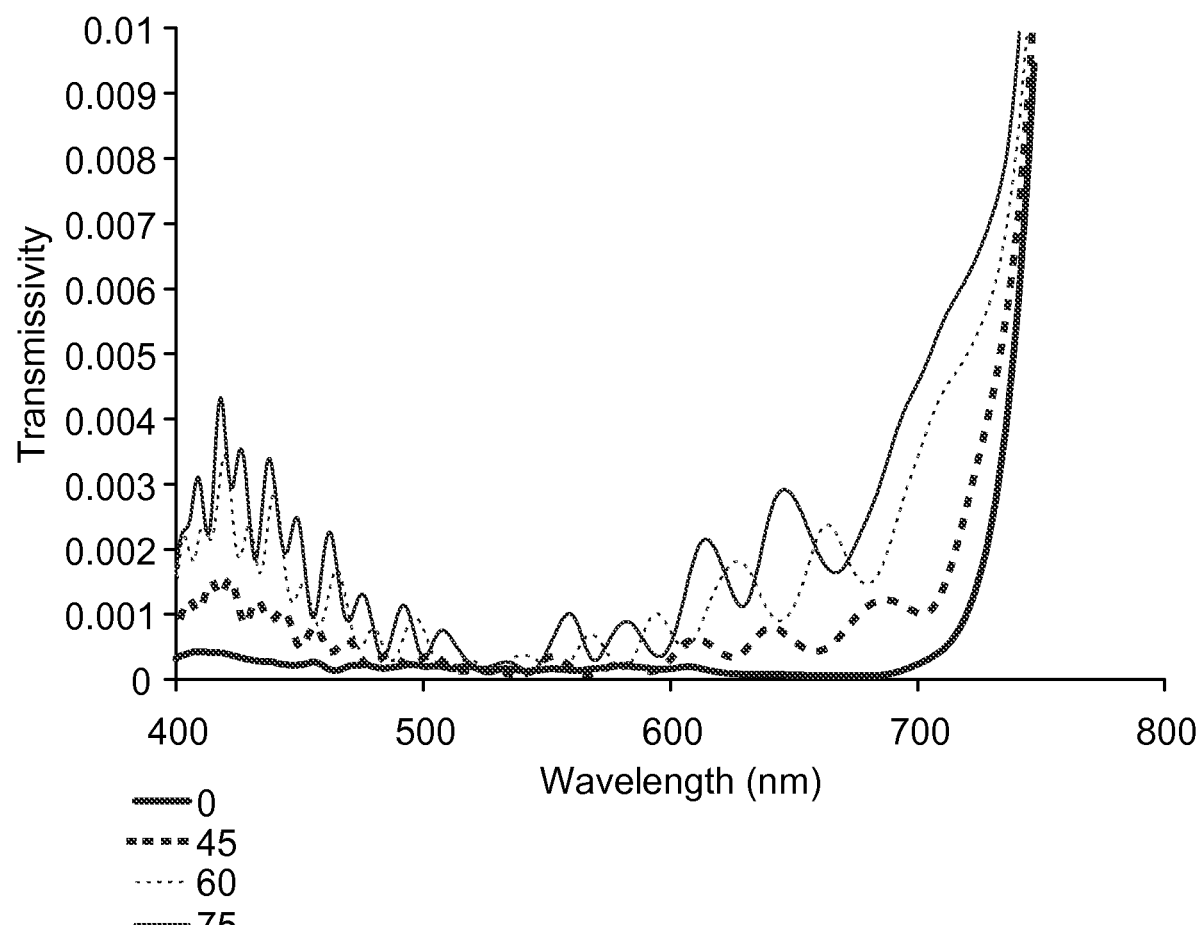
FIG. 16 shows a plot of the same characteristics for the same optical elements as in FIG. 15, with the layer profiles of the reflective polarizers reversed such that the majority of the optically thicker layers faced the analyzer.

Example 4 illustrates that the hybrid polarizer does not have to be constructed with purely uniaxial material layers. The present Example 5 shows that it is desirable to have the thinnest layers of such a construction facing the analyzer. When the layer profiles of the reflective polarizers in Example 4 were reversed such that the majority of the optically thicker layers faced the analyzer, the spectra of FIG. 16 were obtained. Although the average transmission is about the same, a higher frequency ripple is introduced into the spectra, which can cause a higher incidence of perceived color when the display is illuminated with narrow band RGB light sources. Thus the construction of Example 4 is preferred.

Example 6

Example 4, with the not perfectly uniaxial coPEN layers in the APF ($\Delta n_{yz}$=0.015) raises the question of how much birefringence of the layers can depart from uniaxial and still provide a high contrast, i.e. compensatable, display polarizer. To test this limit, a hybrid polarizer was modeled using layers having the indices of standard materials used for the reflective polarizer referred to as Vikuiti™ Dual Brightness Enhancement Film (DBEF), available from 3M Company, for which $\Delta n_{yz}\approx0.08$ in the high index layers. ($n_x\approx1.8$, $n_y\approx1.62$, $n_z\approx1.54$.) Since $n_y=1.62$ the low index material also has $n_x\approx1.62$, giving $\Delta n_x\approx0.18$ between the high and low index layers. To obtain a high contrast construction, stacks of 550 layers in each reflective polarizer were modeled as a laminate with biaxial absorbing and AR layers. The latter two layers were assumed to be absorbing layers with real index values of 1.8, 1.62, and 1.54. Thicknesses were 10 microns and 15 microns respectively, as in Examples 4 and 5. The construction of FIG. 6 was modeled for an azimuth of 25 degrees, with blue layers facing the analyzer, resulting in the spectra of FIG. 17. The irregular spectra and high transmission at 60 and 75 degrees result in rather low contrast at those angles.

Figure 17:
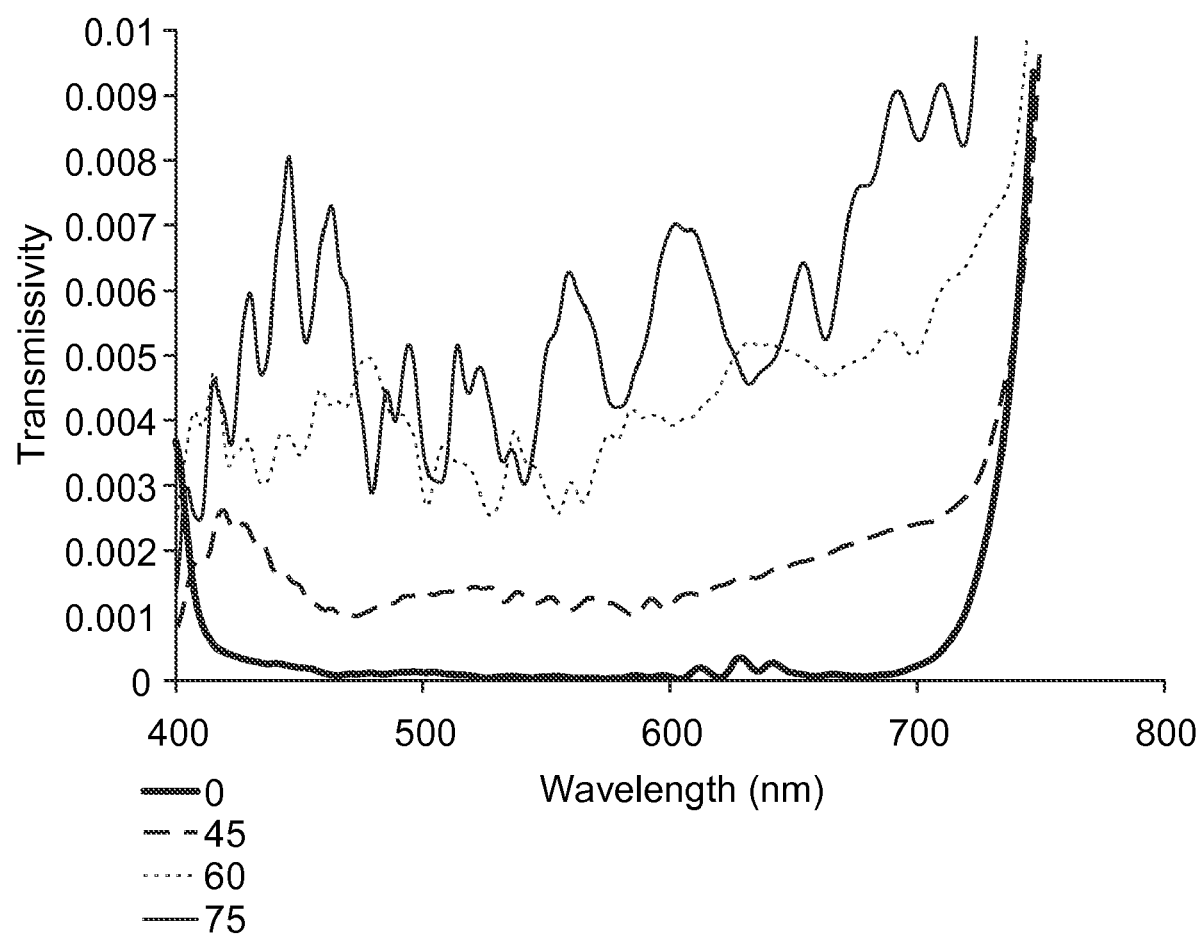
FIG. 17 shows a plot of transmissivity of a crossed absorbing polarizer and yet another exemplary hybrid polarizer according to the present disclosure as a function of wavelength for angles of incidence from 0 to 75 degrees at the azimuth angle of 25 degrees.
Figure 18:
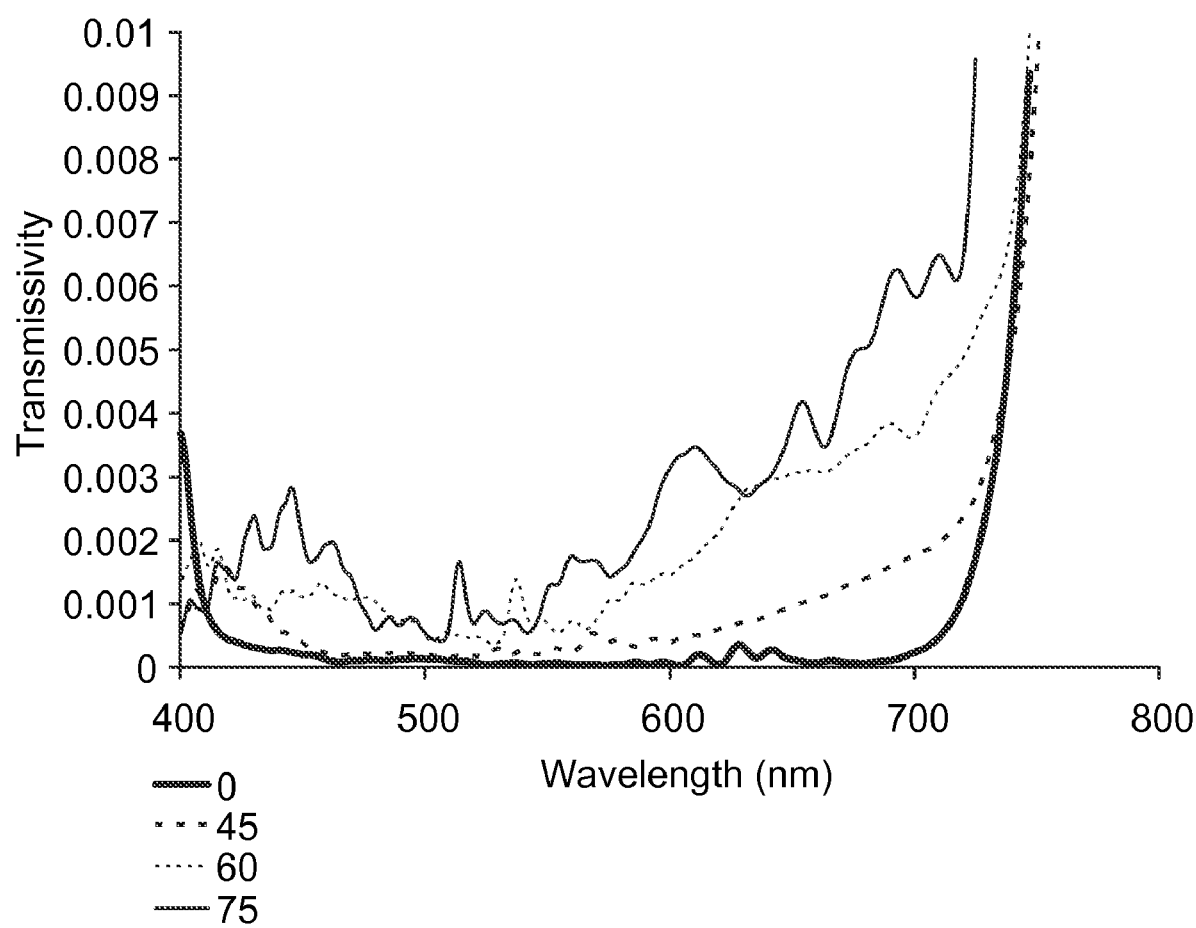
FIG. 18 shows a plot of the same characteristics for the same polarizers as in FIG. 17, except that a D-plate is inserted between the polarizers.

The transmission of the spectra in FIG. 17 can be substantially reduced if the dichroic AR and absorbing layers are uniaxial. This may be possible if those layers are coated, as for a PVA layer, but then the cost advantage of co-extrusion is not realizable. An alternative is to use modified or additional compensation films. For example if the D-plate ($n_x$=1.5917, $n_y$=1.5655, $n_z$=1.5794) is replaced with a film with indices of $n_x$=1.5917, $n_y$=1.5655, $n_z$=1.5731, the spectra of FIG. 18 are obtained. This is only a slight reduction in the z-index of the D-plate, which is rather surprising given that the biaxial material in this hybrid polarizer construction has a low z-index. The spectra of this example have transmissions almost as low as for the uniaxial case (see FIG. 18).

Figure 19:
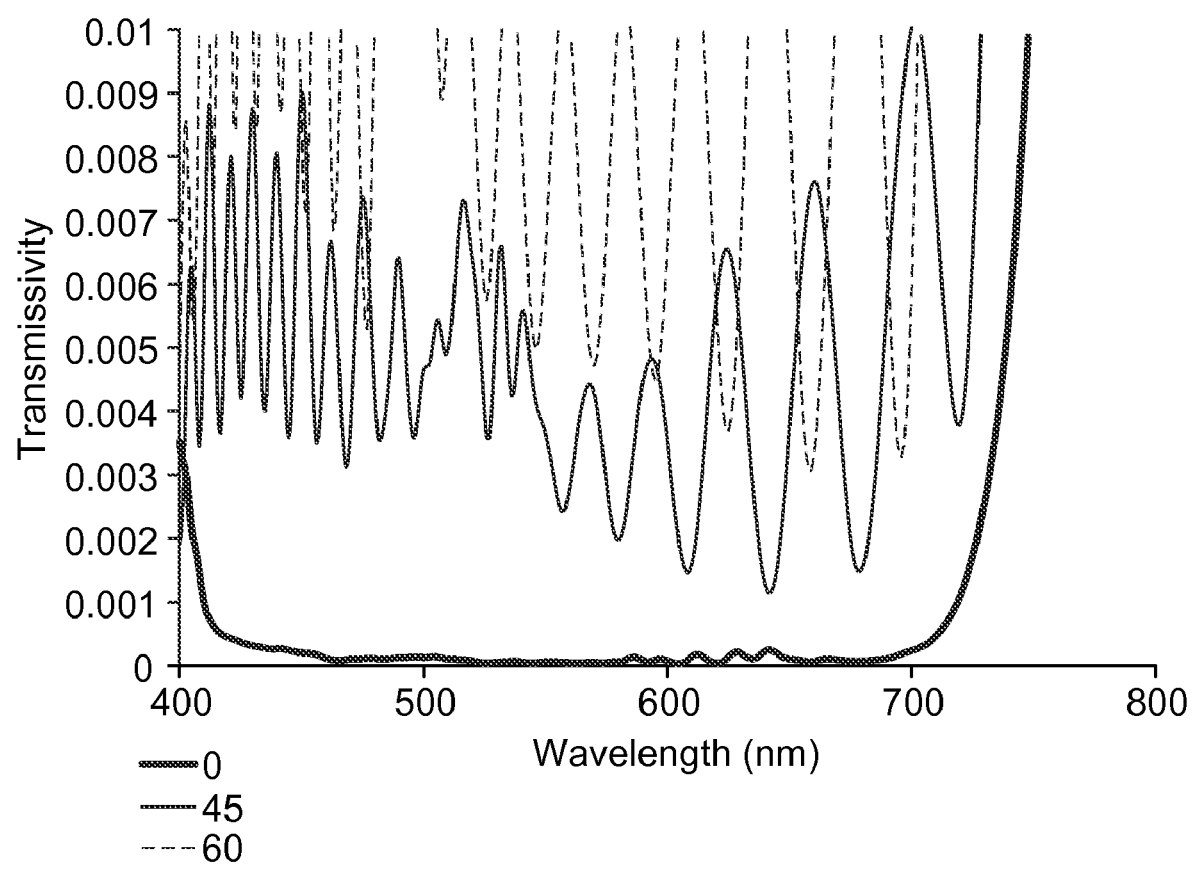
FIG. 19 shows a plot of the same characteristics for the same optical elements as in FIG. 18, with the layer profiles of the reflective polarizers reversed such that the majority of the optically thicker layers faced the analyzer.

For comparison, the same biaxial hybrid polarizer layers were modeled with the red layers facing the analyzer. Using the same modified D-plate, the spectra of FIG. 19 were obtained Advantages of exemplary embodiments of the present disclosure include the possibility of using only one high extinction reflective polarizer in the hybrid polarizer. This can result in reduction of visibility of optical defects in the finished display polarizer. An optical defect is any film defect that causes a noticeable leakage of light when the optical axes of two polarizers are crossed and viewed above a backlight. Such defects can be due to a local disruption of the optical layers by a particle, or can be due to layer profile errors on a larger scale, such as along a line or in an extended area, e.g., caused by disruption of the laminar polymer flow during extrusion. Other spectral leaks may be inherent in the film due to the design of the extrusion hardware that generates the layers. When two reflective polarizers are utilized, the probability of aligned defects is small, the end result being that light leaking through a defect in one polarizer is at least partially blocked by the second polarizer.

Another advantage of exemplary embodiments of the present disclosure is the use of reflective polarizers with lower layer counts with a layer of low contrast absorbing dyes. In the configuration shown in FIGS. 1-3, each of the reflective polarizers needs only a modest level of reflectivity, for example, on the order of or less than 99%, which is a performance level achievable with only about 200 to 300 layers with currently available resin materials. With relatively low polarizing demands on the absorbing layer, a wide range of polarizing dyes can be used in this construction, and these dyes can be chosen to maximize the transmission of the pass state polarization.

Although the polarizers and devices of the present disclosure have been described with reference to specific exemplary embodiments, those of ordinary skill in the art will readily appreciate that changes and modifications may be made thereto without departing from the spirit and scope of the present disclosure. In particular, although a specific display element has not been specified in any of the preceeding examples it should be appreciated that such examples approximately describe devices using a liquid crystal display based on in-plane switching (IPS). As mentioned previously, other types of displays can be employed which may be compensated with additional or alternative elements other than the D-plate.

What is claimed is:

1. A hybrid polarizer comprising:
an absorbing polarizer having a pass axis and a block axis, a first major surface and a second major surface, wherein the absorbing polarizer has absorption of no more than about 5% for light polarized along its block axis;
a first nearly uniaxial birefringent reflective polarizer disposed on the first major surface of the absorbing polarizer, the first nearly uniaxial birefringent reflective polarizer having a first pass axis and a first block axis; and
a second birefringent reflective polarizer disposed on the second major surface of the absorbing polarizer, the second reflective polarizer having a second pass axis and a second block axis.

2. The hybrid polarizer of claim 1, wherein the absorbing polarizer has a contrast ratio of about 100:1 or less.

3. The hybrid polarizer of claim 1, wherein the absorbing polarizer has a contrast ratio of about 10:1 or less.

4. The polarizer of claim 1, further comprising a second absorbing polarizer disposed on the first or second reflective polarizer.

5. A display device comprising:
a display panel and a hybrid polarizer, the hybrid polarizer comprising:
an absorbing element having a first major surface and a second major surface;
a first nearly uniaxial birefringent reflective polarizer disposed on the first major surface of the absorbing element, the first nearly uniaxial birefringent reflective polarizer having a first pass axis and a first block axis; and a second birefringent reflective polarizer disposed on the second major surface of the absorbing element, the second reflective polarizer having a second pass axis and a second block axis;

wherein the first and second pass axes of the first and second reflective polarizers are substantially aligned; and wherein the second reflective polarizer is disposed closer to the display panel than the first reflective polarizer and the second reflective polarizer comprises a plurality of layers characterized by a varying optical thickness and a majority of the layers having a smaller optical thickness are disposed closer to the display panel than the layers having a larger optical thickness.

6. The display device of claim 5, wherein a majority of the layers characterized by a varying optical thickness are disposed such that their optical thicknesses decrease monotonically in the direction toward the display panel.

7. The display device of claim 5, wherein the hybrid polarizer further comprises an anti-reflective layer disposed on the viewer side of the hybrid polarizer.

8. The display device of claim 5, wherein the hybrid polarizer further comprises a rear absorbing layer disposed such that the first nearly uniaxial birefringent reflective polarizer is between the rear absorbing layer and the absorbing element.

9. The display device of claim 5, further comprising a compensation film disposed between the hybrid polarizer and the display panel.

* * * * *

UNITED STATES PATENT AND TRADEMARK OFFICE
CERTIFICATE OF CORRECTION

| | | |
|---|---|---|
| PATENT NO. | : 7,826,009 B2 | Page 1 of 1 |
| APPLICATION NO. | : 11/614494 | |
| DATED | : November 2, 2010 | |
| INVENTOR(S) | : Michael F Weber | |

It is certified that error appears in the above-identified patent and that said Letters Patent is hereby corrected as shown below:

Page 2,
Column 2 (Other Publications), Delete "Polarzier" and insert -- Polarizer --, therefor.

Column 1,
Line 41, Delete "Ouderkirk et. al." and insert -- Ouderkirk et al. --, therefor.

Line 41, Delete "Weber et. al." and insert -- Weber et al. --, therefor.

Column 8,
Line 52, After "3M" insert -- Docket No. 62631US002 --.

Column 12,
Line 61, Delete "therephthalate" and insert -- terephthalate --, therefor.

Column 15,
Line 59, After "obtained" insert -- . --.

Column 16,
Line 28, Delete "preceeding" and insert -- preceding --, therefor.

Signed and Sealed this
Seventh Day of February, 2012

David J. Kappos
*Director of the United States Patent and Trademark Office*